United States Patent [19]

Maesaka et al.

[11] Patent Number: 4,730,542
[45] Date of Patent: Mar. 15, 1988

[54] ELEVATING APPARATUS FOR A WORKING APPARATUS

[75] Inventors: Kiyotomi Maesaka; Nobuo Onodera; Satoshi Matsuzawa; Nobuo Haga; Yasuo Sugimoto, all of Wako, Japan

[73] Assignee: Honda Giken Kogyo Kabushiki Kaisha, Tokyo, Japan

[21] Appl. No.: 880,810

[22] Filed: Jul. 1, 1986

[30] Foreign Application Priority Data

Sep. 5, 1985 [JP] Japan ............................ 60-196367
Sep. 5, 1985 [JP] Japan ............................ 60-196368
Nov. 18, 1985 [JP] Japan ......................... 60-176950[U]
Jan. 10, 1986 [JP] Japan ............................ 61-1802[U]
Jan. 10, 1986 [JP] Japan ............................ 61-1803[U]

[51] Int. Cl.<sup>4</sup> ............................................. F15B 9/10
[52] U.S. Cl. ................................... 91/368; 91/522
[58] Field of Search ............... 91/358, 368, 383, 522; 180/332, 334; 280/460 A, 461 A; 74/471 R

[56] References Cited

U.S. PATENT DOCUMENTS

| | | | |
|---|---|---|---|
| 2,416,373 | 2/1947 | Brown | 91/522 X |
| 2,592,600 | 4/1952 | Randol | 91/358 R X |
| 2,799,251 | 7/1957 | Newgen | 91/383 X |
| 4,100,738 | 7/1978 | Seaberg et al. | 74/471 R X |
| 4,427,026 | 1/1984 | Comer, Jr. et al. | 91/358 R X |

FOREIGN PATENT DOCUMENTS 5413141 6/1970 Japan .
45-26815 10/1970 Japan .

Primary Examiner—Robert E. Garrett
Assistant Examiner—Mark A. Williamson
Attorney, Agent, or Firm—Frishauf, Holtz, Goodman & Woodward

[57] ABSTRACT

An elevating apparatus for a working vehicle includes separate front lifting and rear lifting mechanisms that can be elevated by hydraulic cylinders, a feedback rod arranged between a link arm of one of the lifting mechanisms and a hydraulic pressure control apparatus for controlling the hydraulic cylinders. A change-over lever selects the front lifting mechanism or the rear lifting mechanism, and an elevating lever controls elevation of the lifting mechanisms. When one of the lifting mechanisms is selected and elevated by operation of the change-over lever, the elevating lever is operated normally without causing abutment between an adjuster member attached to the feedback rod that is interactive with the elevating lever, and an interactive member of the elevating lever. A return mechanism between the change-over lever and the elevating lever enables the elevating lever to be returned to the neutral position when selecting one of the front and rear lifting mechanisms. By suitably changing the attached position of a feedback rod with respect to a hydraulic pressure control apparatus, a change-over lever can be attached dismountably to the hydraulic pressure control apparatus, and only one of the hydraulic cylinders can be operated, or both the hydraulic cylinders can be operated alternatively.

7 Claims, 13 Drawing Figures

ELEVATING APPARATUS FOR A WORKING APPARATUS

BACKGROUND OF THE INVENTION

1. Field of the Invention

The present invention relates to an elevating apparatus for a working apparatus that will be mounted on a saddled working car such as a tractor.

2. Description of the Prior Art

Generally, elevation of a ground working apparatus for agriculture and construction by a saddled working car such as a tractor is carried out practically by hydraulic cylinders mounted on the front and the rear of the car body.

Selection for operating the front and rear hydraulic cylinders for actuating the ground working apparatus in the saddled working car has been performed by the operation of a change-over lever provided with a hydraulic pressure apparatus, and controlling the hydraulic cylinders to the elevation operation or the neutral state. That is, use of lifting apparatuses for elevating various ground working apparatuses has been carried out by an elevating lever that is provided separately from the change-over lever of the hydraulic pressure control apparatus.

The connecting mechanism for connecting the change-over lever and the elevating lever is such that a coiled spring is arranged between the change-over lever and the elevating lever wherein the movement of the change-over lever is transmitted to the elevating lever. The prior spring arranged between the change-over lever and the elevating lever has anchoring sections in the shape of a ring that are directly engaged with parts such as stubs or through-holes so that the expansion and contraction of the spring may be directly transmitted to the change-over lever and the elevating lever.

Further, the anchoring sections of the coiled spring has the opposite extended ends in the shape of a letter C.

Since in the prior hydraulic pressure control apparatus for operating a ground working apparatus, the change-over lever is operated to select either the front hydraulic cylinder or the rear hydraulic cylinder, and the elevation of the lifting apparatus of the selected hydraulic cylinder is also effected by the elevating lever provided separately from the change-over lever, the operation of the levers is quite complicated.

Further, if the front hydraulic cylinder is selected by the change-over lever and the link arms of the front hydraulic cylinder are elevated by the operation of the elevating lever, since the spring connecting the change-over lever and the elevating lever has the anchoring sections attached directly to the parts of the change-over lever and the elevating lever, the movement of the change-over lever is transmitted temporarily to the elevating lever via the expansion or contraction of the spring, and therefore the elevating lever that is otherwise in a state requiring no change-over is pulled back to the neutral state by the spring if the elevating lever is in the elevation state.

In the prior art, to allow the spring to act as a connecting mechanism between the levers, the change-over operation of the change-over lever or the elevating lever is prevented by adjusting strictly the rotational friction of the levers and the resilient force of the spring from being transmitted to the other lever, even if the spring is pulled by a certain degree of force. Alternatively, a stopper or the like is arranged to prevent undesired interaction and if the interaction is required, the stopper is released to allow the spring to act as a connecting mechanism.

In the case where a spring is arranged between the change-over lever and the elevating lever, since the anchoring sections of the spring are C-shaped and are small enough to be passed through or fitted to through-holes, stubs or the like formed to the levers, attachment of the anchoring sections to the through-holes, stubs or the like has been difficult and the anchoring sections are liable to be disengaged.

Further, the prior hydraulic pressure control apparatus for operating the working apparatus of a ground working car is required to have a change-over lever for selecting one of the front hydraulic cylinder and the rear hydraulic cylinder and an elevating lever for elevating the lifting apparatus of the selected hydraulic cylinder. Thus, their operations have to be carried out separately and are complicated, and since the hydraulic pressure control apparatus must have separate levers for the operation of the selection of the hydraulic cylinders and the elevation of the lifting apparatus, the production cost of the hydraulic pressure control apparatus becomes high and the production and the assembling thereof are difficult. Further, in some cases, a hydraulic cylinder is mounted only on one of the front and rear sections of a working car, and even in such a case, the hydraulic pressure control apparatus is usually provided with a change-over lever for selecting a hydraulic cylinder.

OBJECTS OF THE INVENTION

An object of the present invention is to provide an elevating apparatus for a working apparatus wherein the operability of an elevating lever and a lifting apparatus change-over lever of a hydraulic pressure control apparatus is simplified, a member interactive with the elevating lever is prevented from engaging with an adjuster member provided to a feedback rod interactive with a link arm of a lifting apparatus so that if one pair of link arms is elevated, the other pair of link arms can be smoothly elevated, and the elevating lever can be semiautomatically returned from the elevation position to the neutral position.

Another object of the present invention is to provide an elevating apparatus for a working apparatus wherein there is little possibility of unfastening of securing means such as a bolt secured to a feedback rod, an account of repeated abutments of an adjuster member acting on an elevating lever against an interactive member of the elevating lever, operation of a change-over lever, vibrations of the car body, etc. and which could result in dislocation of the adjuster member from the feedback rod.

Still another object of the present invention is to provide an elevating apparatus for a working apparatus wherein if the change-over operation of a change-over lever is effected, the movement of the change-over lever is not transmitted to an elevating lever when not required, but if required the elevating lever can automatically be pulled back for example to the neutral position by an improved spring serving as a connecting mechanism for connecting the levers when the change-over operation of the change-over lever is effected, so that the operation of the levers can be simplified.

Still another object of the present invention is to provide an elevating apparatus for a working apparatus wherein the attaching operation of a spring between an elevating lever and a change-over lever provided to a hydraulic pressure control apparatus or the like can be done simply and effectively and the spring is prevented from being disengaged.

Still another object of the present invention is to provide an elevating apparatus for a working apparatus wherein the structure of a hydraulic pressure control apparatus is relatively simple, and if two hydraulic cylinders are mounted, the hydraulic cylinders can be suitably selected to be operated only by changing the position of attachment of a feedback rod, and changing the position of the feedback rod is easily performed.

SUMMARY OF THE INVENTION

The present invention provides an elevating apparatus for a working apparatus, comprising front and rear lifting apparatuses capable of being elevated by hydraulic cylinders, a hydraulic pressure control apparatus for controlling selectively at least two hydraulic cylinders, a feedback rod provided between a link arm of said lifting apparatus and said hydraulic pressure control apparatus, an adjuster member provided to said feedback rod, and a change-over lever for changing over the hydraulic cylinders and an elevating lever for causing a hydraulic cylinder to perform the elevation operation provided to the hydraulic pressure control apparatus, wherein when the front lifting apparatus or the rear lifting apparatus is selected and elevated, abutment of an interactive member of the elevating lever against said adjuster member is avoided thereby allowing the elevating lever to be operated so that if one pair of the link arms is elevated, the other pair of the link arms can be elevated smoothly, and a return mechanism is provided between the elevating lever and the change-over lever of said hydraulic pressure control apparatus for causing the elevating lever to return to the neutral position accordingly when the front lifting apparatus or the rear lifting apparatus is selected thereby making the return of the elevating lever to the neutral position semiautomatic and simplifying the operativity of the change-over lever and the elevating lever.

The present invention also provides an elevating apparatus for a working apparatus, comprising lifting apparatuses capable of being elevated by hydraulic cylinders, a hydraulic pressure control apparatus for controlling selectively at least two hydraulic cylinders, and a feedback rod provided between a link arm of said lifting apparatus and said hydraulic pressure control apparatus, wherein by suitably changing the attached position of said feedback rod with respect to said hydraulic pressure control apparatus, only one of the hydraulic cylinders can be operated or both of them can be operated alternatively, so that if a working apparatus is to be attached only to the front or the rear of a saddled working car, a change-over lever is not required to be attached to the hydraulic pressure control apparatus, and further is lifting apparatuses are mounted on the front and the rear of a saddled working car and are operated alternatively, both the lifting apparatuses can be operated easily by only attaching a change-over lever to the hydraulic pressure control apparatus.

BRIEF DESCRIPTION OF THE DRAWINGS

These and other objects and advantages of the present invention will become more apparent from the following description taken in connection with the accompanying drawings in which.

DETAILED DESCRIPTION OF PREFERRED EMBODIMENTS

Figure 1:
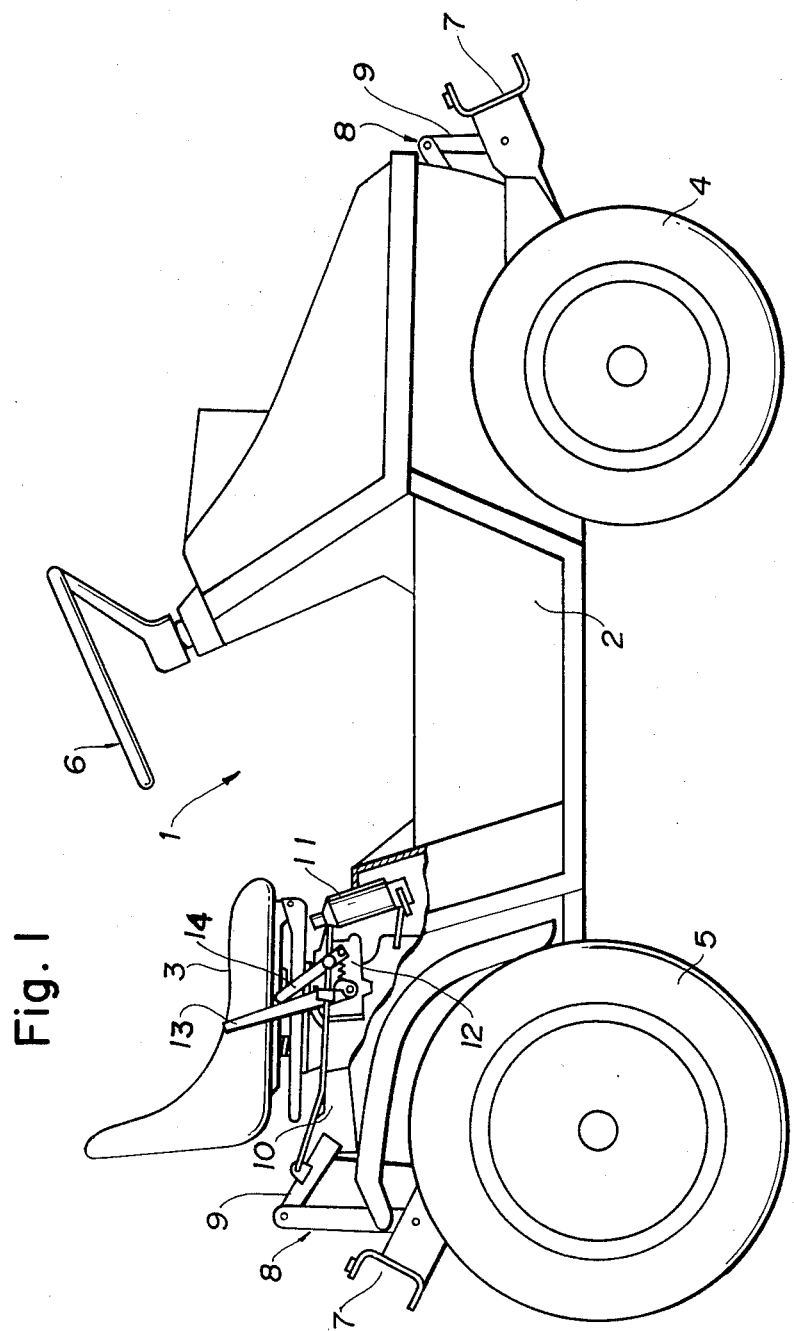
FIG. 1 is a side elevational view of a tractor equipped with an elevating apparatus according to the present invention for a working apparatus, with parts broken away.

First referring to FIG. 1, a saddled working car, or a tractor, equipped with the present elevating apparatus for a working apparatus is described.

FIG. 1 is a side elevational view of a saddled working car 1 with parts broken away, wherein an engine is mounted in the front part of a car body 2 of the saddled working car 1, and a transmission case is situated in the rear part of the car body 2. The crank shaft of the engine and the transmission input shaft are connected generally in a straight line via a propeller shaft. A saddle 3 is mounted at a rear upper part of the car body 2, and front wheels 4 and rear wheels 5 are attached to the front and rear parts of the car body 2 on the right and left sides thereof respectively. By operating a steering wheel 6, the wheels 4, 5 of the saddled working car 1 can be steered, and the four wheels 4, 5 can be driven.

Lift apparatuses 7 are swingably attached to the front and rear parts of the car body 2 respectively, and a working apparatus (not shown) for, for example, agriculture or construction can be attached to the forward end of each lift apparatus 7. One end of each link arm 9 of each link apparatus 8 is pivotally attached to each lift apparatus 7, and the other end of each link arm 9 of each link apparatus 8 is pivotally joined to a hydraulic cylinder 10. The link arms 9 can be swung up and down by movement of a piston in the hydraulic cylinder 10, and the swing motion of the link arms 9 causes the lift apparatus 7 to lift or lower the working apparatus. An oil tank 11 is situated below the saddle 3 and before the rear hydraulic cylinder 10, a hydraulic oil is supplied from the oil tank 11 to an oil pump, and the oil discharged from the oil pump is supplied via a hydraulic pressure control apparatus 12 selectively to the front hydraulic cylinder 10 or the rear hydraulic cylinder 10.

Figure 2:
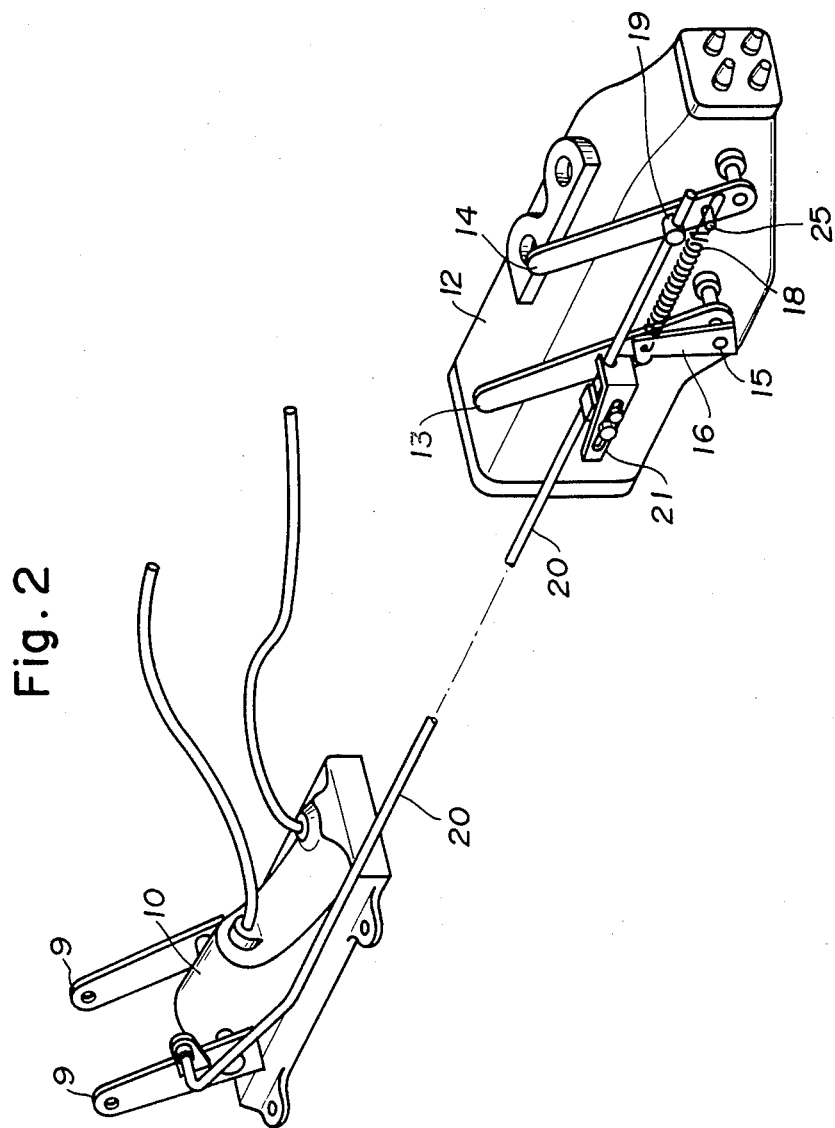
FIG. 2 is an enlarged perspective view of an essential part of the elevating apparatus according to the present invention for a working apparatus.
Figure 3:
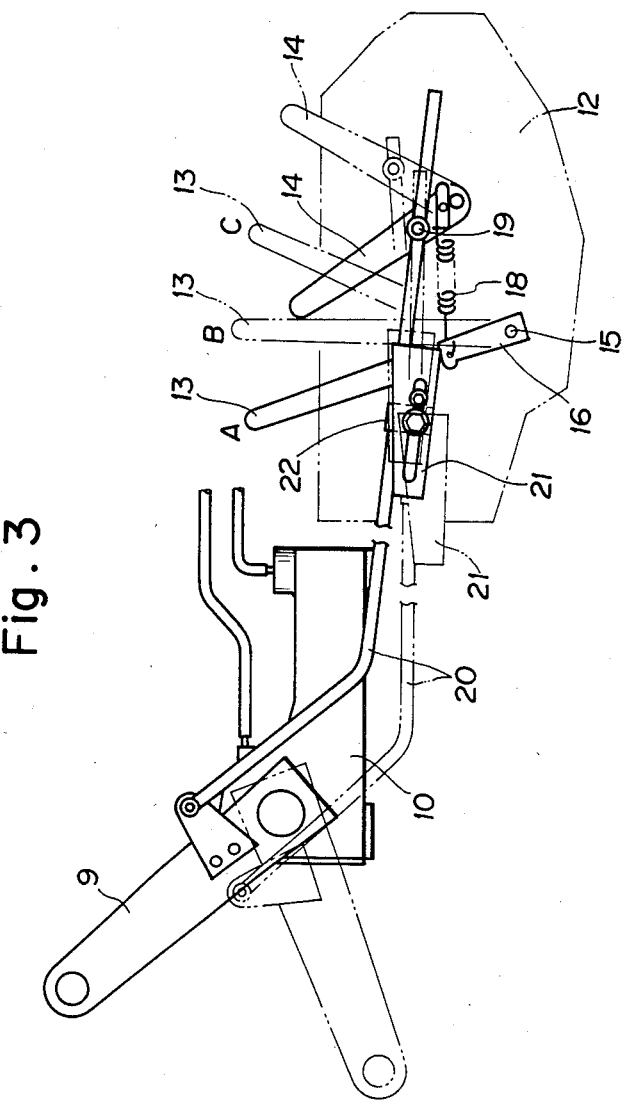
FIG. 3 is a side elevational view of the elevating apparatus of FIG. 2 when elevating a working apparatus.

Now referring to FIGS. 2 and 3, a mechanism is described by which an elevating lever can be operated properly if a change-over lever of the present elevating apparatus is changed to operate either of the hydraulic cylinders and a return mechanism is described by which the elevating lever is returned to the neutral position.

The elevating lever 13 for causing the hydraulic cylinders 10 to perform the elevating action is provided to one side of the hydraulic pressure control apparatus 12 on the left, and the change-over lever 14 for changing over selectively the front hydraulic cylinder 10 or the rear hydraulic cylinder 10 is provided to the side of the hydraulic pressure control apparatus 12 on the right.

The elevating lever 13 is provided with an interactive cam 16 having a rotating shaft 15 that is common to the elevating lever 13, and a coiled spring 18 that is a connecting mechanism for transmitting the movement of the change-over lever 14 to the elevating lever 13 extends between the interactive cam 16 and a stub 25 on one side of the change-over lever 14.

A rod insertion section 19 is located on the intermediate section of the change-over lever 14, the forward end of a feedback rod 20 is passed through the rod insertion section 19 and the other end of the feedback rod 20 is anchored to the link arm 9 that will be actuated by the hydraulic cylinder 10.

An adjuster 21 is attached to the feedback rod 20 adjacent to the elevating lever 13 in such a way that the position of the adjuster 21 can be varied, and the adjuster 21 can abut against the interactive cam 16 when the adjuster 21 is moved from the position shown by phantom line in FIG. 3 to the position shown by solid line in FIG. 3 in the case where the change-over lever 14 is in the position shown in FIG. 2 where it selects the rear hydraulic cylinder 10.

Figure 4:
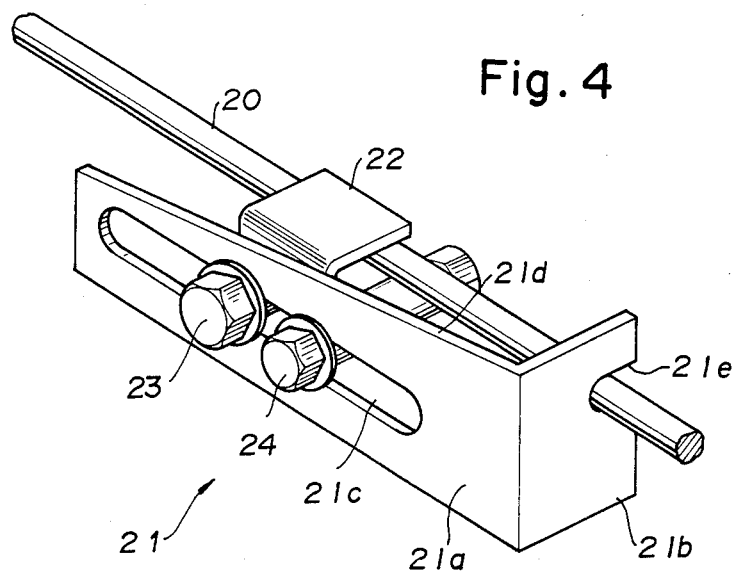
FIG. 4 is an enlarged perspective view of a connected section of an adjuster member and a feedback rod shown in FIG. 2.
Figure 5:
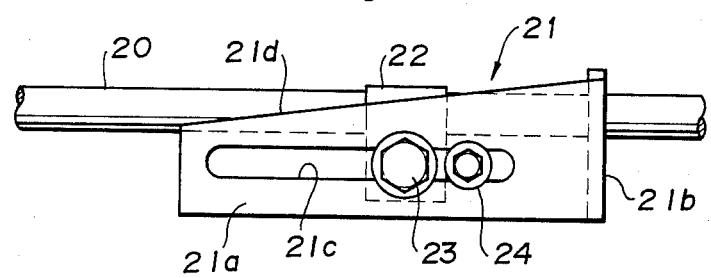
FIG. 5 is a side elevational view of the connected section of the adjuster member and the feedback rod shown in FIG. 4.
Figure 6:
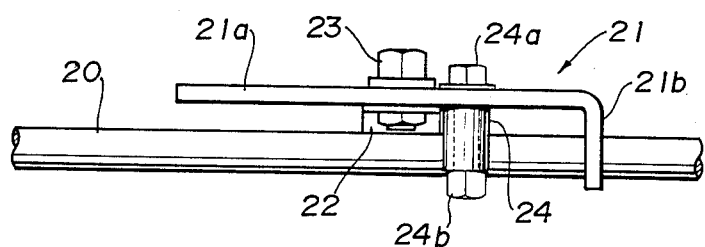
FIG. 6 is a bottom view of the connected section of the adjuster member and the feedback rod shown in FIG. 4.
Figure 7:
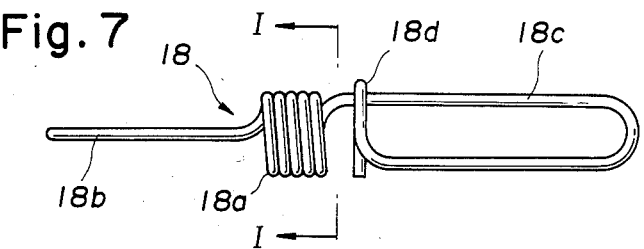
FIG. 7 is an enlarged side elevational view of the spring of the connecting mechanism shown in FIG. 2.
Figure 8:
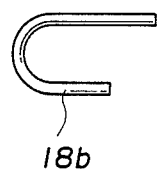
FIG. 8 is a side elevational view of one of the anchoring sections of the spring of FIG. 7.

As shown in FIGS. 4–6, the adjuster 21 comprises a plate main body 21a formed with a longitudinal elongate slot 21c and a bent section 21b with a right angle with the plate main body 21a that engages with the feedback rod 20. The upper side of the plate main body 21a has a sloped surface 21d sloped upward toward the bent section 21b, and the bent section 21b is formed with an engaging recess 21e engageable with the feedback rod 20. The adjuster 21 is provided with an L-shaped fitting 22 having one side surface being secured to the feedback rod 20 by means of welding and other side surface being bent at a right angle and parallel with the feedback rod 20. The adjuster 21 is attached to the feedback rod 20 in such a manner that the plate main body 21a is secured to the fitting 22 by a bolt 23 inserted through the elongate slot 21c, and the bent section 21b is engaged with the feedback rod 20 by the engaging recess 21e. Accordingly, the position of the adjuster 21 can be varied along the feedback rod 20 within the range of the elongate slot 21c.

Further, to prevent the position of the attached adjuster 21 from being moved, a stopper 24 consisting of a bolt 24a and an elongate nut 24b are provided to the side surface of the fitting 22. The stopper 24 is secured to the plate main body 21a in such a manner that the elongate nut 24b is inserted into the elongate slot 21c until it abuts against the side surface of the fitting 22 and the elongate nut 24b is threadably engaged with the bolt 24a. Thus the attachment of the adjuster 21 to the feedback rod 20 can be effected by attaching the stopper 24 and the fitting 22 to suitable positions of the elongate slot 21c taking into account the relationship between the elevating lever 13 and the interactive cam 16 with the elevating lever 13.

As shown in FIGS. 7–10, the spring connecting the change-over lever 14 and the elevating lever 13 comprises a coiled section 18a, an anchoring section 18b on the side of the elevating lever 13, and an anchoring section 18c on the side of the change-over lever 14, the anchoring section 18b on the side of the elevating lever 13 is extended from one end of the coiled section 18a and is formed approximately into a U shape, and the anchoring section 18c on the side of the change-over lever 14 is extended longer than the anchoring section 18b from the other end of the coiled section 18a and is bent into the shape of an ellipse. The anchoring section 18c is constructed like a so-called safety pin and a hook section 18d of the anchoring section 18c can be released due to the resiliency of the linear material constituting the anchoring section 18c when it is required to be anchored.

Figure 9:
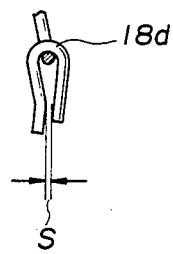
FIG. 9 is a sectional view taken along line I—I in FIG. 7.
Figure 10:
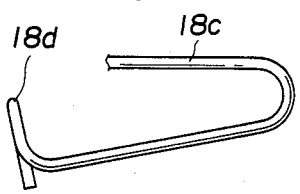
FIG. 10 is a side elevational view of the other anchoring section of the spring of FIG. 7.

As shown in FIG. 9, the hook section 18d has a slit S formed by bending the linear material that is a little smaller than the diameter of the linear material so that the hook section 18d when it is anchored would not easily be disengaged.

The spring 18 is attached in such a manner that the anchoring section 18b is inserted into an anchoring section 16a (in the shape of a through-hole in this embodiment) formed in the interactive cam 16 and the anchoring section 18c is fitted on a fitting groove 25a in a stub 25 on the change-over lever 14.

Operation of the arrangement is described below. When the change-over lever 14 for the front and rear hydraulic cylinders 10 is in the rear position, that is the position shown in solid line in FIGS. 2 and 3, the hydraulic cylinder 10 is in the position for lowering by the operation of the elevating lever 13. At this time, if the elevating lever 13 is rotated to the elevation position shown by A in FIG. 3, the link arms 9 of the hydraulic cylinder 10 are elevated and the feedback rod 20 whose end is anchored to the link arm 9 is moved upward toward the right in FIG. 3. Then the adjuster 21 attached to the feedback rod 20 can abut against the upper end of the interactive cam 16 that has been rotated integrally with the elevating lever 13 and therefore the elevating lever 13 will be rotated from the elevation position to the neutral position shown by B in FIG. 3.

Therefore, if the link arms 9 are inadvertently elevated, the elevating layer 13 would not remain at the elevation position but is returned to the neutral position without fail.

Since the adjuster 21 is not attached to the feedback rod 20 by directly bolting but is attached to the side of the feedback rod 20 via the fitting 22, and the stopper 24 for preventing the dislocation of the adjuster 21 is abutted against the fitting 22, the position of the adjuster 21 positioned to the feedback rod 20 by the fitting 22 is secured by the stopper 24 and is positively fixed to the feedback rod 20. Accordingly, by the rotational operation of the elevating lever 13 to the elevation position when the change-over lever 14 is in the rear position, the adjuster 21 will abut against the upper end of the interactive cam 16 that is rotated integrally with the elevating lever 13 and will cause the elevating lever 13 by the spring 18 to rotate from the elevation position to the neutral position after the completion of the elevation action, and therefore there is no possibility of undesirable loosening of the attachment of the adjuster 21 constructed as illustrated above to the feedback rod 20 due to the repeated abutment thereof against the interactive cam 16 or operation of the change-over lever 14, vibrations of the car body, or the like.

Figure 11:
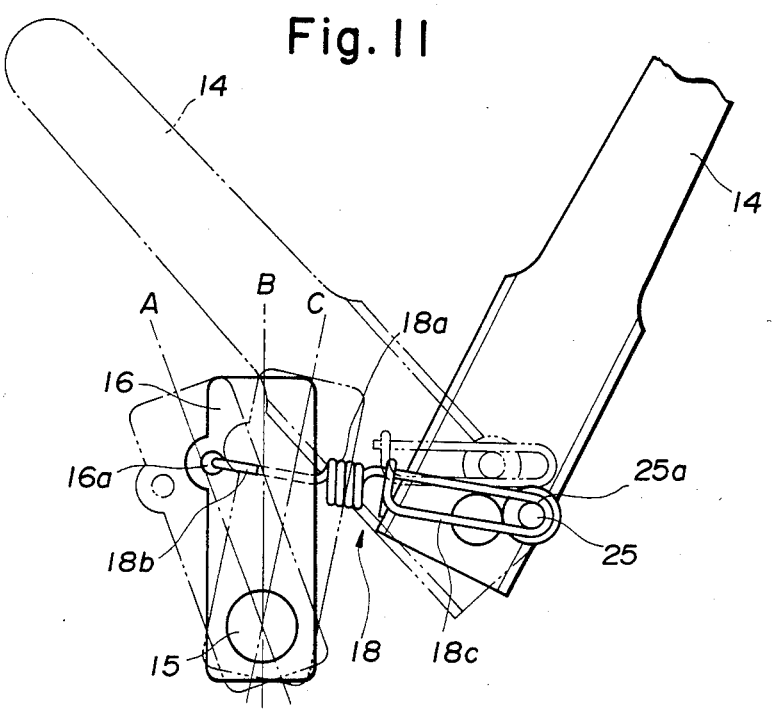
FIG. 11 is an enlarged side elevational view of the connecting mechanism shown in FIG. 3, showing the operation of the connecting mechanism.

Since the spring 18 connecting the elevating lever 13 and the change-over lever 14 is constructed as illustrated above, if the elevating lever 13 is changed over to the elevation position shown by A in FIGS. 3 and 11, the neutral position shown by B in FIGS. 3 and 11, and the lowering position shown by C in FIGS. 3 and 11, the movement of the elevating lever 13 would not be transmitted directly to the change-over lever 14 since the anchoring section 18c of the spring 18 has an ellipse shape, which makes the anchoring section 18c slide freely on the stub 25.

On the other hand, when the change-over lever 14 is in the forward position shown by phantom line in FIG. 3 and by solid line in FIG. 11, the feedback rod 20 will be moved up as shown by phantom line in FIG. 3 since the rod insertion section 19 of the change-over lever 14 is moved up. As a result, if the link arms 9 are elevated, the interactive cam 16 that is rotated integrally with the elevating lever 13 would not abut against the adjuster 21 attached to the feedback rod 20. Accordingly, in the case when the change-over lever 14 has already been tilted forward, the elevating lever 13 would not become inoperative if the rear link arms 9 are elevated. Further, in the case when the change-over lever 14 has been tilted forward, the elevating lever 13 will be always returned to the neutral position since the spring 18 is actuated by the stub 25 that is integrally rotated with the change-over lever 14 to draw the interactive cam 16.

Now the relative action of the elevating lever 13 and the change-over lever 14 and the spring 18 positioned between them is shown in detail in the Table below:

TABLE

RELATIONSHIP BETWEEN THE ELEVATING LEVER AND THE CHANGE-OVER LEVER AND THE SPRING

| | Elevation lever 13 | | |
|---|---|---|---|
| | Elevation | Neutral | Low |
| Change-over Lever 14 Forward | Tensed | Tensed | Free |
| Reward | Free | Free | Free |

Therefore, if the change-over lever 14 selects the front hydraulic cylinder 10 as mentioned, and when the elevating lever 13 is changed over to the elevation, neutral or low position, the spring 18 positioned between them is tensed in the elevation and neutral positions as seen from the Table, and is free in the low position.

That is, in the above state, the change-over lever 14 is operated to the position shown by phantom line in FIG. 3 (or the position shown by solid line in FIG. 11), and the stub 25 on the side of the change-over lever 14 is rotated toward the right and is positioned to the rightmost position of the elliptic anchoring section 18c of the spring 18.

As stated above, when the elevating lever 13 is operated to one of the positions shown by A, B and C in FIGS. 3 and 11, the spring 18 is tensed except when the elevating lever 13 is in the low position, and therefore the operator who changes over the elevating lever 13 can be notified that the change-over lever 14 is operated to the front hydraulic cylinder 10. When the elevating lever 13 is in the position B, tensing the spring 18 begins, and therefore the lever in the position B would not be moved to the position C.

In particular, when the elevating lever 13 is set to the elevation position, that is, the position A, the above relationship is noticeable if the state where the rear hydraulic cylinder 10 is selected as shown by solid line in FIG. 3 is changed to the state where the front hydraulic cylinder 10 will be selected.

Therefore, if the change-over lever 14 is changed over from the left in the FIG. 3 to the right, since the rotation of the change-over lever 14 is transmitted via the spring 18 to the elevating lever 13 that has been set to the elevation position, the elevating lever 13 will be pulled back at least to the neutral position, the position B, by the tension of the spring 18.

Accordingly, in the above case, by the change-over operation of the change-over lever 14, the elevating lever 13 that has been set to the elevation position will be pulled back to the neutral position automatically, so that the operation of the levers can be simplified.

As mentioned above the coiled spring 18 is attached in such a manner that the anchoring section 18b is inserted through the through-hole 16a formed in the interactive cam 16, and the anchoring section 18c is fitted in the fitting groove 25a in the stub 25 on the change-over lever 14. The attachment is carried out in such a manner that the hook section 18d is released, the elliptic section of the anchoring section 18c is spread, and the anchoring section 18c is put in the fitting groove 25a in the stub 25. Thus, the anchoring operation of the spring 18 between the elevating lever 13 and the change-over lever 14 can be carried out easily and simply, and the spring 18 can be prevented from disanchoring.

With respect to the above embodiment of the present elevating apparatus for a working apparatus, hydraulic cylinders are mounted on the front and rear of the car body respectively and can be selected alternatively to elevate the working apparatus.

With respect to further embodiments of the present elevating apparatus that will be described below, if two hydraulic cylinders are mounted on the working apparatus, one of or both of them can be suitably selected to be alternatively operated by the optional presence of a change-over lever.

Figure 12:
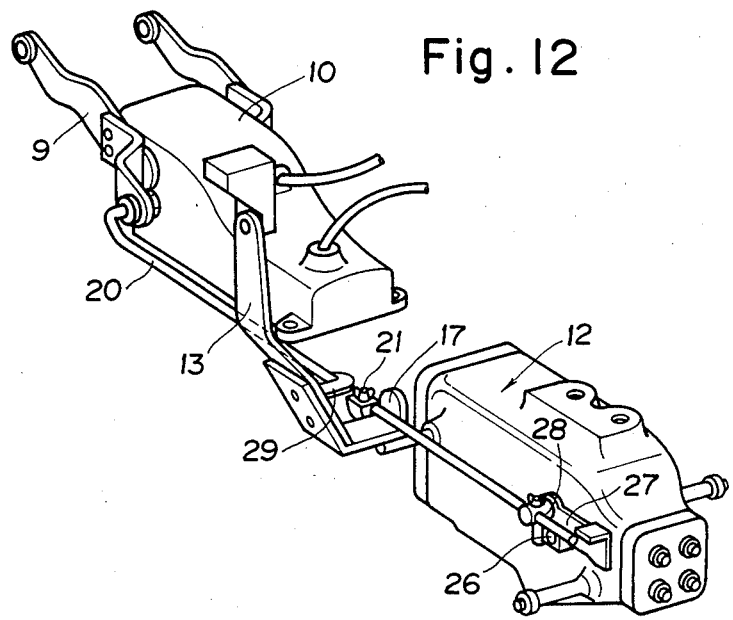
FIGS. 12 and 13 are perspective views of elevating apparatuses according to the invention, showing positions where the feedback rod is attached.

With respect to the embodiment shown in FIG. 12, of the hydraulic cylinders 10, only the rear hydraulic cylinder 10 is operated. An attaching rod 26 for attaching a change-over lever 14 (see FIG. 13) is situated at the side of the forward section of the hydraulic pressure control apparatus 12 and can be rotated alone. A fixed cam 27 is fixed to the side surface of the hydraulic pressure control apparatus 12 by bolts or the like, and one end of the feedback rod 20 is attached to a rod support 28 attached to the fixed cam 27, with the other end of the feedback rod 20 being attached to the link arm 9 of the lifting apparatus 7. The elevating lever 13 is situated approximately at the intermediate section of the side of the hydraulic pressure control apparatus 12.

According to the above construction, the change-over lever 14 for selecting the front hydraulic cylinder or the rear hydraulic cylinder 10, 10 is attached to the attaching rod 26, the fixed cam 27 is attached to the hydraulic pressure control apparatus 12, and the feedback rod 20 that will be displaced by the elevation action of the link arm 9 of the rear hydraulic cylinder 10 is attached to the rod support 28 arranged to the fixed cam 27, so that only the rear hydraulic cylinder 10 is kept operative.

Therefore, this embodiment is suitable for the saddled working car 1 where the front hydraulic cylinder 10, if mounted, would not be operated, and the working apparatus is operated only by the rear hydraulic cylinder 10.

When the elevating lever 13 is tilted backward to the position where the lifting apparatus is elevated, the adjuster 21 attached to the feedback rod 20, which adjuster 21 is bolted to the feedback rod 20 and can be secured to a suitable position of the feedback rod 20, is also moved upward and forward, and is abutted against the cam 17 fixed to the end of the elevating lever 13 to move the elevating lever 13 forward to return the elevating lever 13 to the neutral position, and the link arms 9 will be stopped at the uppermost position.

Figure 13:
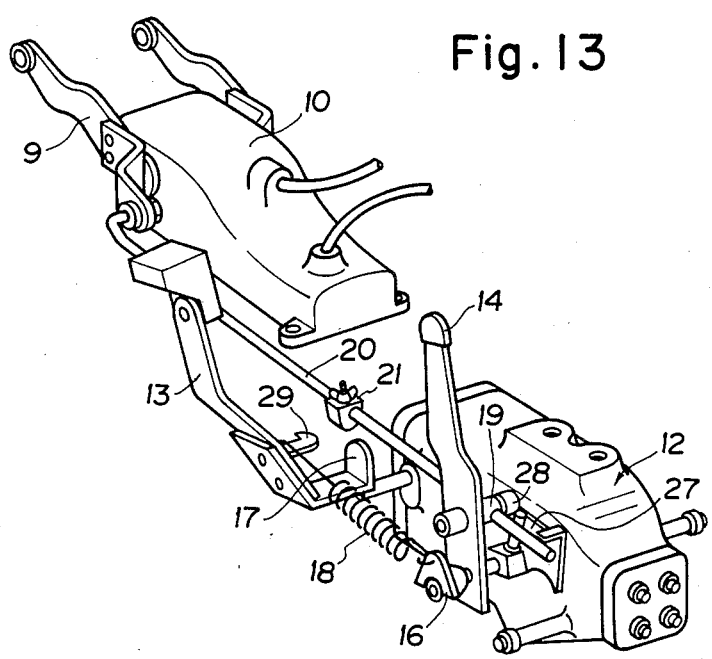

The mode illustrated in FIG. 13 shows the construction of the hydraulic pressure control apparatus 12 that can select the hydraulic cylinders 10, 10 alternatively to be operated.

In this case, a rod insertion section 19 provided approximately to the intermediate section of the change-over lever 14 is attached to the rod support 28, and the feedback rod 20 is attached to the rod insertion section 19. Although in this case the rod insertion section 19 is situated between the change-over lever 14 and the control box, that is, situated behind the change-over lever 14 as shown, and in the elevating apparatus illustrated in FIGS. 2 and 3, the rod insertion section 19 is attached to the front section of the change-over lever 14, their function is the same.

Thus, the position of the feedback rod 20 is approximately the same as in the case where the feedback rod 20 is displaced only by the rear hydraulic cylinder 10.

The interactive cam 16 movable integrally with the change-over lever 14 is provided to the outside of the change-over lever 14, and the spring 18 extends between the hook 29 attached to the elevating lever 13 and the interactive cam 16.

In the above construction, since the change-over lever 14 is provided, the front and rear hydraulic cylinders 10, 10 can be alternatively selected to be actuated by operating the change-over lever 14.

Therefore, according to the present invention, depending on whether the change-over lever 14 is set to the hydraulic pressure control apparatus 12, only the rear hydraulic cylinder 10 can be operated or the front and rear hydraulic cylinders 10, 10 can be alternatively selected to be operated.

If the front hydraulic cylinder 10 is in operation, the spring 18 extending between the hook 29 of the elevating lever 13 and the interactive cam 16 provided to the change-over lever 14 acts to rotate the elevating lever 13, so that if the elevating lever 13 is operated to the elevation position, it is pulled to the neutral position by the spring 18. However, if the elevating lever 13 is left at the elevation position where the rear hydraulic cylinder 10 is operated, the adjuster 21 attached to the feedback rod 20 abuts against the cam 17 of the elevating lever 13 to cause it to return automatically to the neutral position thereby stopping the link arms 9. Therefore, when the change-over lever 14 is operated for the front hydraulic cylinder 10, the front lifting apparatus 7 would not be abruptly elevated.

Although particular embodiments of the present invention have been described in detail above, it will be appreciated that various modifications and changes may be made without departing from the spirit and scope of the present invention.

What is claimed is:

1. An elevating apparatus for a working apparatus, comprising:
    a front lifting mechanism and a rear lifting mechanism each having a link arm and arranged to be capable of being elevated by pressure from hydraulic cylinders,
    a hydraulic pressure control arrangement for controlling selectively a supply of pressure from at least two hydraulic cylinders,
    a feedback rod coupled between the link arm of one of said front and said rear lifting mechanisms and said hydraulic pressure control arrangement,
    an adjuster member fixed at a desired position along said feedback rod,
    a change-over lever for selecting operation of one of the hydraulic cylinders and an elevating lever for causing the selected hydraulic cylinder to perform an elevation operation of a corresponding lifting mechanism, both said levers forming a part of said hydraulic pressure control arrangement,
    an interactive member fixed to a part of said elevating lever for movement with the elevating lever and engaging said adjuster member in camming relation, said change-over lever including rod insertion means in which an end portion of said feedback rod opposite the end of the rod coupled to said link arm is allowed to pass, and
    means coupled between the elevating lever and the change-over lever for enabling the elevating lever to be operated, including means for preventing said interactive member from interfering with movement of the adjuster member fixed on said feedback rod when either one of the front lifting mechanism or the rear lifting mechanism is selected and elevated.

2. An elevating apparatus for a working apparatus as claimed in claim 1, wherein said adjuster member comprises a plate main body having a longitudinal elongate slot and a bent section bent from the plate main body that can be engaged with the feedback rod, said adjuster member is attached to the feedback rod by a fitting secured to the feedback rod using said elongate slot with said adjuster member movable along the feedback rod, and a stopper for preventing the attached position of the adjuster by abutting against the fitting from being dislocated is attached to the adjuster member.

3. An elevating apparatus for a working apparatus, comprising:
    a front lifting mechanism and a rear lifting mechanism each having a link arm and arranged to be capable of being elevated by pressure from hydraulic cylinders,
    a hydraulic pressure control arrangement for controlling selectively a supply of pressure from at least two hydraulic cylinders,
    a feedback rod coupled between the link arm of one of said front and said rear lifting mechanisms and said hydraulic pressure control arrangement,
    an adjuster member fixed at a desired position along said feedback rod,
    a change-over lever for selecting operation of one of the hydraulic cylinders and an elevating lever for causing the selected hydraulic cylinder to perform an elevation operation of a corresponding lifting mechanism, both said levers forming a part of said hydraulic pressure control arrangement, and return means coupled between the elevating lever and the change-over lever, which return means, when either one of the front lifting mechanism or the rear lifting mechanism is selected by said change-over lever, causes the elevating lever to return to a neutral position accordingly.

4. An elevating apparatus for a working apparatus as claimed in claim 3, wherein said return mechanism comprises a spring arranged between the elevating lever and the change-over lever and only when the change-over lever is changed over to the front lifting apparatus or the rear lifting apparatus, the change-over operation can be transmitted by the spring to return the elevating lever to the neutral position.

5. An elevating apparatus for a working apparatus as claimed in claim 4, wherein the shape of anchoring sections of the spring where anchoring to the change-over lever and the elevating lever is made is formed in such a manner that the anchoring sections can abut against and slide on the sections of the change-over lever and the elevating lever where the anchoring sections are anchored.

6. An elevating apparatus for a working apparatus as claimed in claim 5, wherein the anchoring section of the spring where anchoring to the change-over lever is made is formed approximately into an elliptic shape and the free end section of the elliptic anchoring section is bent to be formed into a hook section, and the hook section is anchored to the linear part of the anchoring section.

7. An elevating apparatus for a working apparatus, comprising:
a front lifting mechanism and a rear lifting mechanism each having a link arm and arranged to be capable of being elevated by pressure from hydraulic cylinders,
a hydraulic pressure control arrangement for controlling selectively a supply of pressure from at least two hydraulic cylinders,
a feedback rod coupled between the link arm of one of said front and said rear lifting mechanisms and said hydraulic pressure control arrangement,
means for enabling only one of the hydraulic cylinders to be operated, or both the hydraulic cylinders to be operated alternatively, in accordance with the relative position at which said feedback rod is coupled to said hydraulic pressure control arrangement.

* * * * *